Sept. 8, 1953 A. MACKMANN 2,651,212
POWER TRANSMISSION MECHANISM FOR WINDOW REGULATORS
Filed Oct. 11, 1950 2 Sheets-Sheet 2

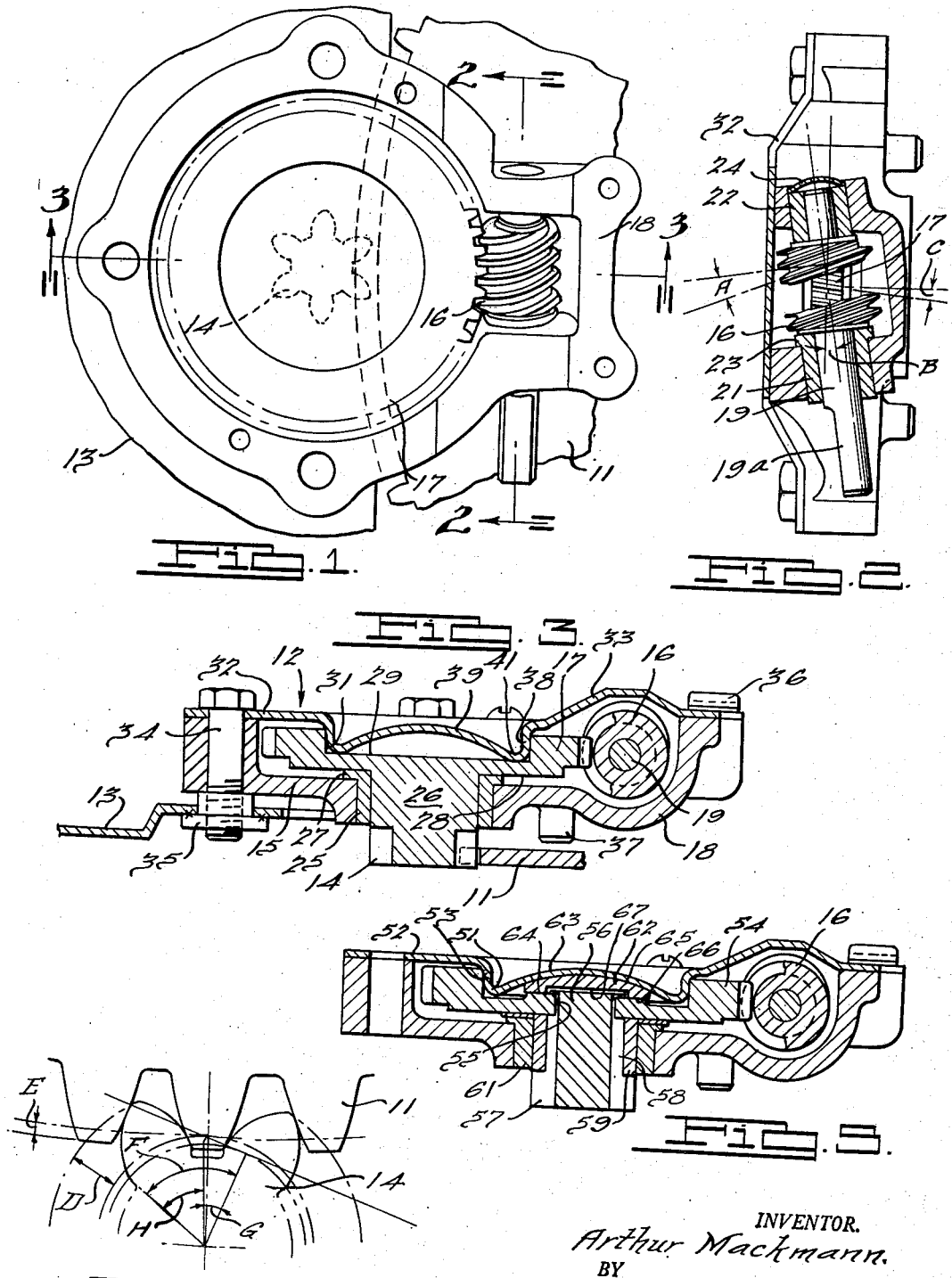
Sept. 8, 1953
A. MACKMANN
2,651,212
POWER TRANSMISSION MECHANISM FOR WINDOW REGULATORS
Filed Oct. 11, 1950
2 Sheets-Sheet 1
INVENTOR.
Arthur Mackmann.
BY
Harness, Dickey & Pierce
ATTORNEYS.

INVENTOR.
Arthur Mackmann.
BY
Harness, Dickey & Pierce
ATTORNEYS.

Patented Sept. 8, 1953

2,651,212

UNITED STATES PATENT OFFICE 2,651,212

POWER TRANSMISSION MECHANISM FOR WINDOW REGULATORS

Arthur Mackmann, Chicago, Ill., assignor to Hupp Corporation, Cleveland, Ohio, a corporation of Virginia Application October 11, 1950, Serial No. 189,623

13 Claims. (Cl. 74—425)

This invention relates to window regulators and the like, and especially to power transmission mechanisms for window regulators in automotive vehicles wherein the windows are raised and lowered by rotary power means such as a reversible electric motor.

Among the problems which are encountered in the design of power transmission mechanisms of the type described is that of achieving a large reduction in speed from a power source such as a small, high-speed motor to the window actuating linkage, and simultaneously preventing jamming or locking of the mechanism when the window reaches its stalled position. The limitation of space and the necessity for quick operation of the windows make it necessary that the power transmission mechanism be compact and have a relatively high efficiency. However, it is essential that the mechanism be so constructed as to prevent reversing action when force is applied directly to the window, so that it will be impossible to open the window except by actuation of the power means.

It is therefore an object of the present invention to provide a power transmission mechanism for an automotive window regulator which will be extremely compact in construction, and will have sufficiently high speed reduction, without danger of locking or jamming of the mechanism when the window is being tightly seated at the terminal positions.

It is another object to provide a transmission mechanism as described having a relatively high efficiency without the attendant danger of reversibility of operation, thus preventing opening of the window by a force applied directly thereto.

It is a further object to provide a power transmission unit as an integral part of a window regulator mechanism as described, which is of relatively simple design and construction and which can be manufactured as a package unit for cooperation with the standard types of window regulator linkages now in conventional use.

Other objects, features, and advantages of the present invention will become apparent from the subsequent description taken in conjunction with the accompanying drawings.

In the drawings:

Figure 1 is a plan view of a portion of the power transmission mechanism of this invention with the cover plate removed;

Fig. 2 is a side cross-sectional view taken along the line 2—2 of Fig. 1 and showing the worm train and associated parts;

Fig. 3 is a cross-sectional view taken along the line 3—3 of Fig. 1 and showing the housing, worm wheel and cover plate;

Fig. 4 is a detail view of the pinion and its associated gear sector;

Fig. 5 is a cross-sectional view similar to Fig. 3 but showing a modification of the power transmission unit;

Figure 6:
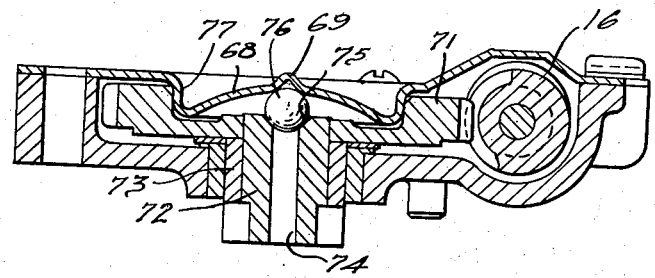
Fig. 6 is a cross-sectional view similar to Fig. 3 but showing a second modification of the cover plate and shaft support.

The power transmission mechanism of this invention is designed for use especially with the conventional types of automotive window regulators which have a gear or gear sector 11 rotatably mounted within the door panel and connected to a window actuating linkage (not shown) which may comprise one or more swingable arms or similar elements. The mechanism is particularly adapted for use in installations where no manual means are provided for actuating the window but wherein a reversible electric motor (not shown) or other rotary power means is mounted within the door panel for operating the mechanism. The major portion of the power transmitting mechanism comprises a power transmission unit 12 which is attached to a mounting bracket 13 within the body of the door and transmits the rotary power from the motor to gear sector 11. However, as will later appear, the scope of the invention includes the design of gear sector 11 and its cooperation with pinion 14 of the power unit, as well as the structure of the power unit itself.

The power unit comprises in general an opensided housing 15 having rotatably mounted therein a worm 16 and a meshing worm gear 17. The worm 16 is mounted within an extension 18 of the housing by means of a shaft 19 and spaced bearing sleeves 21 and 22. It will be noted that the shaft 19 is in inclined relation to the plane of the housing, so that the shank 19a thereof extends away from the housing. This angularity B of the shaft may be so chosen as to permit the motor to be mounted in a curved door body out of the plane of the housing and be connected to the shank 19a by a flexible shaft or similar element (not shown). The bearing sleeves are secured within spaced apertures (not designated) at opposite side walls of housing extension 18. Bearing 21 is held in position by a shoulder 23 engageable with the inner surface of the housing, and a dome-shaped plug 24, preferably of spring-like material, is inserted outwardly of bearing 22 to hold the latter in position as well as to weather-seal the housing opening. Worm gear 17 is rotatably mounted in the side wall of housing 15 by means of a bearing sleeve 25. The hub 26 of worm gear 17 extends through the housing 15 and pinion 14 is formed on the outer end of hub 26. A shoulder 27 on bearing 25 holds the side 28 of worm gear 17 in spaced relation with the inner surface of the housing 15. The opposite side of worm gear 17 is provided with a circular recess having a flat floor portion 29 and an annular side wall 31, this recess being concentric with hub 26.

A cover plate 32 is provided for the open end of the housing, and this cover plate has an extension 33 which encloses the worm 16 within the extension 18 of the housing. The cover plate 32 is flush with the peripheral surface of housing 15 and is attached at spaced points thereto by means of bolts or screws 34 which extend through the housing and serve also to attach the housing to mounting bracket 13 by means of threaded washers or similar fasteners 35 attached to the bracket. Smaller bolts 36 serve to hold the extension 33 of the cover to housing extension 18. A plurality of projections 37 may be formed on the housing to hold it in proper spaced relation to the mounting bracket and gear sector. The cover 32 is further provided with a circular projection extending inwardly therefrom concentric with the recess on worm gear 17. This projection has an annular side wall 38 and a dome-shaped intermediate portion 39, an annular portion 41 of relatively sharp radius connecting the wall and dome-shaped portions. Wall portion 38 is adapted to be in engagement with side wall 31 of the worm gear recess, and annular bearing portion 41 is adapted to engage the floor portion 29 of the recess. It will thus be seen that the cover projection will serve to hold worm gear 17 against both radial and axial movement, since any tendency to move radially will be resisted by wall 38 of the projection and any axial movement will be resisted by bearing portion 41. This construction greatly lessens the possibility of noise and vibration due to radial motion of the worm gear, and resists the effect of thrust forces due to the angularity of the worm gear teeth.

From the structure thus far described it will be apparent that upon operative rotation of shaft 19 in either direction worm gear 17 will be rotated, thus rotating pinion 14 and moving gear sector 11 to actuate the window linkage arms to raise or lower the window. Because of the relatively high speed motor which must necessarily be used it is necessary that a speed reduction of about 400:1 take place between the shaft 19 and the gear sector 11. It has also been found essential, due to the space limitations involved, that a pinion 14 of relatively few teeth must be used in order to achieve proper results when the conventional size gear sector, ordinarily the equivalent of a gear having about 120 teeth, is used. The present invention combines these principles of operation by providing a two step gear reduction in which each step provides about half of the necessary speed reduction. More particularly, a construction is provided in which the speed ratio between worm 16 and worm gear 17 is approximately 20:1, and the speed ratio between pinion 14 and gear sector 11 is likewise about 20:1, thus providing a total reduction of 400:1. No particular limitations are placed on the actual number of teeth of the worm and worm gear, and the worm may subsequently be a single, double or triple thread type with a corresponding number of worm gear teeth to achieve the desired speed reduction. As stated previously, the conventional gear sector 11 is the equivalent of a gear having 120 teeth and the pinion 14 will subsequently have about six teeth, as shown in Fig. 1. It should be clearly understood, however, that the overall speed ratios, the individual step reductions, and the numbers of teeth described above are merely illustrative, and that the principles of this invention herein described are applicable to power transmission units having other proportions than those in the illustrated embodiment.

The efficiency of the worm and worm gear are preferably of such controlled magnitude as to be relatively close to the margin of non-reversibility at rest when a rotary force is applied to the worm gear greater than the normal force from the connected load. It has been found that the 20:1 speed ration of the worm and worm gear is such that jamming or locking of the threads of the worm and the worm gear when the window reaches its terminal position is substantially prevented, while at the same time the ratio is high enough to prevent reversible operation of the mechanism by force applied directly to the window. It has also been found that the particular helix angle A used for the threads of worm 16 have a decided effect on the reversibility of the mechanism as well as on the tendency to jam or lock when full stalling torque power is applied, that is, when the window reaches a terminal position while power is still applied to the motor. This may be more clearly understood from an examination of the figures, whereby it will be seen that if too small a helix angle is used the frictional wedging action of the helix threads upon the worm gear teeth will be so great when full stalling torque is applied as to make it extremely difficult to dislodge the worm upon reversing the motor. Likewise, when worm gear 17 attempts to drive worm 16 (for example, when force is applied directly to the window) too great a helix angle will allow the component of force parallel to the helix threads to overcome the component normal to the threads, thereby driving shaft 19.

The construction of this invention provides a worm 16 having a helix angle A approximately equal to the friction angle between the worm and worm gear teeth, as determined by the materials used for these two parts and the finishes provided on the contacting surfaces. This angle will normally be in the range between 5° and 15°, and it has been found that a helix angle within these limits avoids both the possibility of jamming at full stalling torque and the possibility of reversible operation. It will be noted that because of the angularity of the axis of shaft 19 to the plane of worm gear 17 it is necessary to cut the teeth on the worm gear so as to compensate for this angularity; for example, with a worm helix angle A of 12° 41' and an angularity B of the shaft 19 of 7° 41', the angularity C of the worm gear teeth should be 5°, as shown in Fig. 2.

In order to further assure against the reversibility of operation of the mechanism, as well as to provide smooth tooth-to-tooth involute action between pinion 14 and gear sector 11, a long-andshort addenda type of tooth form is used for these two elements of the train. As shown in Fig. 4, this construction provides a relatively long addendum D on each tooth of pinion 14 and a relatively short addendum E on each gear sector tooth. As is well known, this type of gear construction is particularly suited for one-way gear trains wherein driving pinions of relatively few teeth are meshed with gears having relatively many teeth. This tooth construction results in an arc of action F comprising a relatively short arc of approach G and a relatively long arc of recession H, so that while smooth action is achieved when the pinion is driving the gear, the teeth will tend to lock if gear 11 attempts to drive pinion 14, since in this event the long arc H will become the arc of approach, resulting in greater friction.

It will thus be seen that when the speed ratio of the worm and worm gear and the helix angle of the worm are such as to approach the margin of reversibility from rest, the inherent tendency of gear 11 and pinion 14 to lock will serve to prevent reversible operation of the mechanism. This cooperative action between the pinion drive and the worm drive plays an important role in the illustrated embodiment wherein the 12° 41′ worm helix angle and the worm speed reduction of approximately 20:1 are close to the margin of reversible operation from rest.

Fig. 5 illustrates a modification of the power transmission unit 12 having elements similar to the embodiment of Figs. 1 to 4 but wherein the annular portion 51 of the cover 52 does not serve as a thrust bearing as in the previous embodiment. The annular wall portion 53, which corresponds to wall portion 31 of the previous modification still serves, however, as a radial bearing for the worm gear 54. The worm gear has a splined bore 55 within which is staked the inner end of pinion shaft 56. For this purpose the teeth of the pinion are cut along the full length of shaft 56, the outer portions 57 of the teeth being of full size and acting as the drive pinion, and the remaining lengths 58 of the teeth being of smaller outside diameter and acting as a spline staked in bore 55. A steel sleeve 59 is tightly fixed on tooth portions 58 of the pinion shaft, and this sleeve is journaled in a bearing 61, preferably of bronze, which is mounted in the housing.

In order to take the axial thrust loads on worm gear 54 and its associated parts, a bearing block 62 is disposed between the dome-shaped portion 63 of cover 52 and the worm gear. A flat annular raised thrust surface 64 is formed on worm gear 54 immediately surrounding the splined bore 55. Bearing block 62 is provided with an upper surface 65 having a convex shape of curvature corresponding to that of dome-shaped cover portion 63. The opposite side of bearing block 62 has an annular flat surface 66 in flush engagement with the portion 64 of the worm gear, and a clearance recess 67 is provided in the bearing block adjacent shaft 56. It will be seen therefore that outer surface 65 of the bearing block will be engageable with the inner surface of dome-shaped cover portion 63, the latter holding the bearing block in concentric relation with the worm gear. Inner surface 66 of the bearing block will bear against annular portion 64 of the worm gear, and the bearing block will thus serve as an axial thrust bearing for the worm gear and its associated parts.

Fig. 6 illustrates a second modification of the bearing structure which is generally similar to that of Fig. 5. In this embodiment the dome-shaped cover portion 68 is provided with a centrally located retaining recess 69 which is concave inwardly. The worm gear 71 is staked to pinion shaft 72 in a manner similar to that shown in Fig. 5, and the pinion shaft is provided with a sleeve 73 as in the previous embodiment. The shaft is also provided with a concentric aperture 74 and the inner end of the shaft has an inwardly tapered recess 75 contiguous with aperture 74. A spherical or similar anti-friction member 76 is held in operative position between recesses 69 and 75 and will thus act as a thrust bearing for shaft 72. It will be observed that due to the configuration of the recesses ball member 76 will also resist some of the radial forces acting on the worm gear. If desired, the annular wall portion 77 of the cover plate may also contact the worm gear as in the previous embodiment, thus also resisting some of the radial forces.

Figure 7:
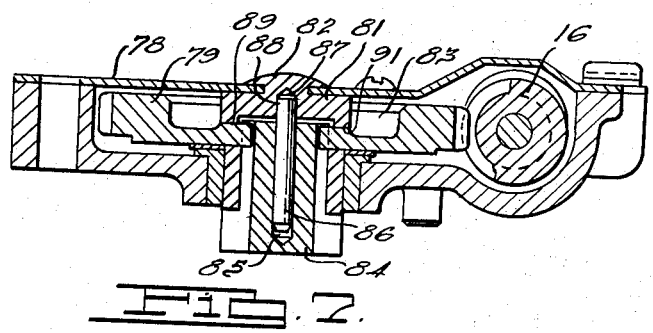
Fig. 7 is a cross-sectional view similar to Fig. 3 and showing still another modification of the shaft supporting means.

Fig. 7 shows a further modification having a cover plate 78 of flat shape adjacent worm gear 79. The cover plate is not in direct contact with the worm gear and thus performs directly neither the function of a radial bearing member nor that of a thrust bearing. A bearing block 81 is secured to the cover plate 78, for example by a peened stub 82, and extends inwardly within circular recess 83 of the worm gear. The pinion shaft 84, which is staked to the worm gear as in the previous embodiment, is provided with a bore 85 which is blind on one end and within which is firmly secured a pilot pin 86. The pilot pin extends outwardly from bore 85 toward the cover, and the bearing block 81 is provided with a concentric bearing aperture 87 within which the outer end 88 of the pilot pin is received. Worm gear 79 is further provided with a flat annular surface 89 surrounding the pinion shaft, and the inner end of bearing block 81 has a flat annular thrust bearing surface 91 in engagement with surface 89. The bearing block 81 thus serves both as a thrust and a radial bearing member for the worm gear and the pinion shaft.

Figure 8:
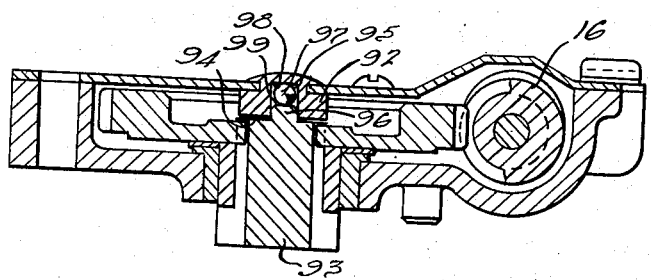
Fig. 8 is a cross-sectional view similar to Fig. 3 showing a fourth modification of the power transmission unit.

Fig. 8 is another modification generally similar to that of Fig. 7 and having a bearing block 92 corresponding to the bearing block 81 of Fig. 7. However, the diameter of bearing block 92 is relatively smaller and preferably does not extend beyond the diameter of pinion shaft 93. The inner end 94 of bearing block 92 is in spaced relation with the adjacent end of shaft 93, and a bearing aperture 95 in the bearing block is concentric with the shaft. A concentric journal stub 96 extends outwardly from shaft 93 and is disposed within bearing aperture 95. A spherical ball member 97 is disposed at the bottom 98 of bearing aperture 95, the bottom preferably being of flat shape. The size of spherical member 97 is such that the end 99 of the stub 96 will be in contact therewith. The side wall of bearing aperture 95 will thus act as a radial bearing for the shaft 93 and its associated parts, and the spherical member 97 will serve as a thrust bearing therefor.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

I claim:

1. In a power transmission system for a window regulator or the like, a worm adapted to be connected to a rotary driving motor, a worm gear driven by said worm, the helix angle of said worm being approximately equal to the friction angle between the two materials of said worm and worm gear, the efficiency of said worm and worm gear being of such controlled magnitude as to be relatively close to the margin of non-reversibility at rest when a rotary force is applied to the worm gear greater than the normal force from the connected load, a pinion rotatable with said worm gear, and a driven gear meshing with said pinion and adapted to be connected to the operating linkage of a window regulator or the like, the teeth on said pinion and driven gear being of the long-and-short addenda type, whereby reversibility of operation of the entire gear train from a state of rest is substantially prevented when a force from a foreign source is applied directly to the window.

2. The combination according to claim 1, further provided with a shaft for said worm rotatably mounted adjacent said worm gear and adapted to be connected to a rotary power source, the axis of said shaft being angularly displaced from the plane of said worm gear.

3. In a power transmission system for a window regulator or the like, a worm adapted to be connected to a rotary driving motor, a worm gear driven by said worm, the axis of said worm being angularly displaced from the plane of said worm gear, the efficiency of said worm and worm gear being of such controlled magnitude as to be relatively close to the margin of non-reversibility at rest, a pinion rotatable with said worm gear, and a driven gear meshing with said pinion and adapted to be connected to the operating linkage of a window regulator or the like, the speed ratio between said pinion and driven gear being substantially equal to said worm and worm gear ratio, the teeth on said pinion and driven gear being of the long-and-short addenda type, whereby the meshing teeth on said pinion and driven gear have a relatively short arc of approach and a long arc of recession.

4. In a power transmission system for a window regulator or the like, a worm adapted to be connected to a rotary driving motor, a worm gear driven by said worm, the helix angle of said worm being approximately equal to the friction angle between the two materials of said worm and worm gear, a pinion rotatable with said worm gear, and a driven gear meshing with said pinion and adapted to be connected to the operating linkage of a window regulator or the like, the teeth on said pinion and driven gear being of the long-and-short addenda type, whereby the meshing teeth on said pinion and driven gear have a relatively short arc of approach and a relatively long arc of recession.

5. The combination according to claim 4, the helix angle of said worm being greater than 5°, whereby jamming of the teeth on said worm and worm gear when full stalling torque is applied is substantially prevented.

6. The combination according to claim 4, the overall speed ratio between said worm and said driven gear being approximately 400:1, said speed ratio being substantially equally divided between the speed ratios of the worm and worm gear and the pinion and driven gear.

7. In a power transmission unit for a window regulator or the like, an open-sided housing, a worm rotatably mounted in said housing and adapted to be connected to rotary driving means, a worm gear within said housing and operatively meshing with said worm, a pinion on one side of said worm gear and rotatable therewith, said pinion being adapted for a driving connection with the operating linkage of a window regulator or the like, a recess on the opposite side of said worm gear and concentric therewith, said recess having a circular side wall portion and a flat floor portion, and a cover for the open side of said housing, said cover having an annular inner projection engageable with said wall portion and said floor portion, whereby said projection holds said worm gear against both axial and radial movement.

8. In a power transmission unit for a window regulator or the like, an open-sided housing, a worm rotatably mounted in said housing and adapted to be connected to rotary driving means, a worm gear within said housing and operatively meshing with said worm, a pinion on one side of said worm gear and rotatable therewith, said pinion being adapted for a driving connection with the operating linkage of a window regulator or the like, a recess on the opposite side of said worm gear and concentric therewith, said recess having a circular side wall portion and a flat floor portion, a cover for the open side of said housing, said cover having an annular inner projection engageable with said wall portion to hold said worm gear against radial movement, an inwardly concave dome-shaped portion on said cover, and a bearing block between said cover and said worm gear, said bearing block having an outer convex surface engageable by said dome-shaped cover portion and an inner flat surface engageable with the floor portion of said worm gear recess, whereby said worm gear is held against axial movement.

9. In a power transmission unit for a window regulator or the like, an open-sided housing, a worm rotatably mounted in said housing and adapted to be connected to rotary driving means, a rotatable shaft extending through said housing, a worm gear mounted on said shaft within said housing and operatively meshing with said worm, a recess on one side of said worm gear, said recess having a circular side wall portion, a pinion mounted on said shaft and extending outwardly of said housing, said pinion being adapted for connection with the operating linkage of a window regulator or the like, a retaining recess at one end of said shaft, a cover for the open side of said housing, a retaining recess on the inner surface of said cover and concentric with said shaft retaining recess, and a spherical member between said cover and said shaft and retained by said retaining recesses, whereby said shaft is held against axial and radial movement.

10. The combination according to claim 9, said cover having an annular inner projection engageable with said wall portion to further hold said worm gear against radial movement.

11. In a power transmission unit for a window regulator or the like, an open-sided housing, a worm rotatably mounted in said housing and adapted to be connected to rotary driving means, a rotatable shaft extending through said housing, a worm gear mounted on said shaft within said housing and operatively meshing with said worm, a pinion mounted on said shaft and extending outwardly of said housing, said pinion being adapted for a driving connection with the operating linkage of a window regulator or the like, a cover for the open side of said housing, a bearing block mounted on said cover and extending inwardly therefrom, said bearing block having a flat annular surface engageable with the adjacent side of said worm gear shaft, and a bearing aperture within said bearing block, one end of said shaft being disposed within said aperture.

12. In a power transmission unit for a window regulator or the like, an open-sided housing, a worm rotatably mounted in said housing and adapted to be connected to rotary driving means, a rotatable shaft extending through said housing, a worm gear mounted on said shaft within said housing and operatively meshing with said worm, a pinion mounted on said shaft and extending outwardly of said housing, said pinion being adapted for a driving connection with the operating linkage of a window regulator or the like, a cover for the open side of said housing, a bearing block mounted on said cover and extending inwardly therefrom, a bearing aperture at the inner end of said bearing block, one end of said shaft being disposed within said aperture, and an anti-friction member within said bearing aperture between the end of said shaft and the bottom of the aperture.

13. In a power transmission system for a window regulator or the like, a worm adapted to be connected to a rotary driving motor, a worm gear driven by said worm, the axis of said worm being angularly displaced from the plane of said worm gear, the helix angle of said worm being approximately equal to the friction angle of the two materials used for said worm and worm gear, the efficiency of said worm and worm gear being of such controlled magnitude as to be relatively close to the margin of non-reversibility at rest, a pinion rotatable with said worm gear, and a driven gear meshing with said pinion and adapted to be connected to the operating linkage of a window regulator or the like, the teeth of said pinion and driven gear being of the long-and-short addenda type with said pinion having approximately six teeth, the overall speed ratio between said worm and said driven gear being approximately 400:1, said speed ratio being substantially equally divided between the speed ratios of the worm and worm gear and the pinion and driven gear.

ARTHUR MACKMANN.

References Cited in the file of this patent

UNITED STATES PATENTS

| Number | Name | Date |
|---|---|---|
| 243,634 | Sellers et al. | June 28, 1881 |
| 1,149,206 | Mechling, Jr. | Aug. 10, 1915 |
| 1,711,500 | Hutchens | May 7, 1929 |
| 1,839,368 | Baum | Jan. 5, 1932 |
| 2,173,660 | Perkins | Sept. 19, 1939 |
| 2,176,956 | Cook et al. | Oct. 24, 1939 |
| 2,190,741 | Sylvester | Feb. 20, 1940 |
| 2,299,338 | Meyer, Jr. | Oct. 20, 1942 |